United States Patent Office 2,769,370
Patented Nov. 6, 1956

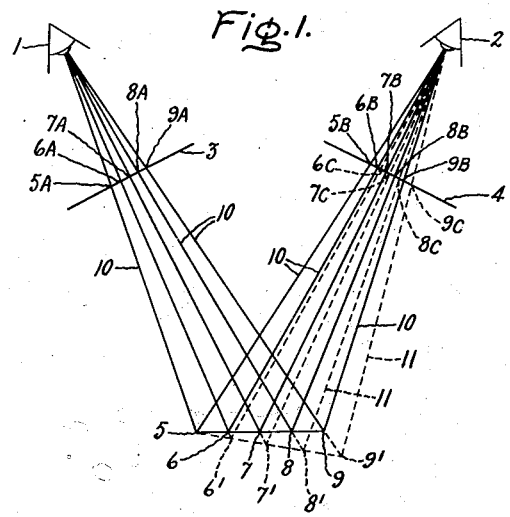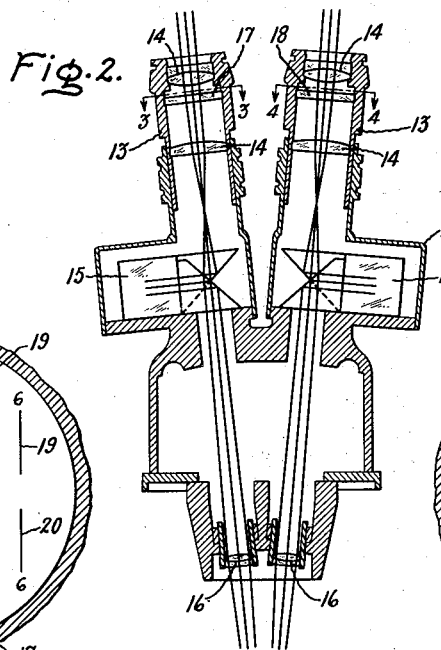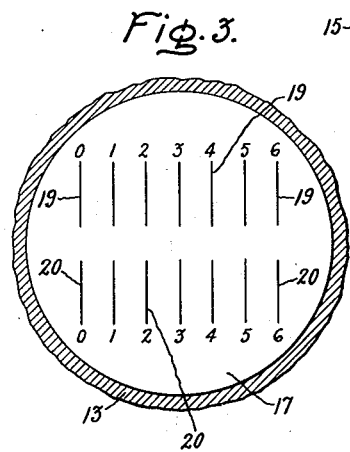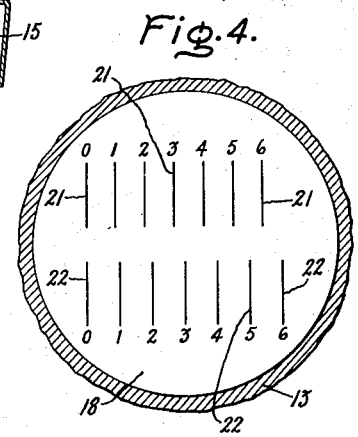

2,769,370

STEREOSCOPIC MICROSCOPE FOR MEASURING DEPTHS

Russell E. Tompkins, Schenectady, N. Y., assignor to General Electric Company, a corporation of New York Application December 15, 1954, Serial No. 475,483

2 Claims. (Cl. 88—39)

This invention relates to a stereoscopic microscope for measuring depths, and more particularly to the use of stereoscopic reticules in such a microscope to measure microscopic depths.

It is well known that whenever metal stampings or punchings are made, minute scratches and burrs are produced upon the stampings or punchings by the dies making them. It is extremely important for quality control to determine whether or not these burrs or scratches exceed known depths. In the case of burrs, their depths materially affect the life of the dies; and since these dies are very expensive it will be obvious that a simple, accurate instrument for measuring burr depths would save many thosandus of dollars. An instrument for measuring the depths of burrs or scratches, in order to be commercially practical, would have to be portable, rugged and relatively inexpensive; and such an instrument would have to measure burr or scratch depths non-destructively, since any other type of measuring instrument would destroy the burr or scratch being measured. The present invention accomplishes all of the foregoing objectives by utilizing stereoscopic reticules, similar to those used in range finders, in a stereoscopic microscope, to measure microscopic depths non-destructively.

It is, therefore, one object of this invention to provide an instrument for measuring microscopic depths.

It is another object of this invention to provide an instrument for measuring microscopic depths non-destructively.

It is a further object of this invention to provide a stereoscopic microscope for non-destructively measuring microscopic depths.

Other objects and advantages will appear as the description of the invention proceeds.

In accordance with the invention, a stereoscopic microscope is disclosed for measuring extremely small depths, depths being defined as distances extending from the eye of a user of the microscope. This microscope includes in each eyepiece a transparent disk having markings thereupon, these disks being known to the art as stereoscopic reticules. These reticules provide a three-dimensional illusion of a scale of markings appearing to lie at various depths from the eye of a user of the microscope. By properly spacing the markings on the reticules, the distances between the scale markings can be calibrated in terms of depth. Thus, when the microscope is focused upon the object whose depth is being measured, the difference between a scale marking at the top of the object and a scale marking at the bottom of the object will provide a measure of the height of the object.

The features of this invention which are believed to be novel and patentable are pointed out in the claims which form a part of this specification. For a better understanding of the invention, reference is made in the following description to the accompanying drawings, wherein like parts are indicated by like reference numerals in which:

Fig. 1 is a sketch illustrating the stereoscopic principles of the present invention;

Fig. 2 is a diagram, partially in cross section, of a stereoscopic microscope embodying the stereoscopic reticules of the present invention;

Fig. 3 shows a view of one stereoscopic reticule taken along line 3—3 of Fig. 2; and Fig. 4 shows a view of another stereoscopic reticule taken along line 4—4 of Fig. 2.

Referring now to Fig. 1, there is shown a sketch illustrating the stereoscopic principles upon which the present invention relies. In this figure, there are shown a pair of eyes 1 and 2 belonging to an observer who is gazing down at a pair of stereoscopic reticules 3 and 4 respectively disposed between his eyes. Reticules 3 and 4 are transparent disks, which can be made of glass, and they have a linearly arranged series of spaced markings etched thereupon. On reticule 3, the markings are labelled 5A, 6A, 7A, 8A and 9A; and on reticule 4, these markings are labelled 5B, 6B, 7B, 8B and 9B. Rays of light 10 are shown as entering eyes 1 and 2 and passing through the markings on the reticules. It will be apparent from this drawing that eyes 1 and 2 will fuse the rays of light passing through markings 5A and 5B and that this fusion will result in the appearance of a single point at a point 5. It will also be apparent that a similar fusion will take place for the other markings on reticules 3 and 4 and that points 6, 7, 8 and 9 will appear to the observer, points 5 to 9 forming a line.

Referring now to reticule 4, let it now be presumed that the markings on this reticule are now located at 5B, 6C, 7C, 8C and 9C, and rays of light 11, shown as dashed lines, pass through these markings. Marking 6C is displaced from 6B by a slight amount, 7C from 7B by a slightly greater amount, 8C from 8B by a still greater amount, and 9C from 9B by yet a greater amount. It will be seen from the drawing that eyes 1 and 2 will fuse the rays of light to form a new series of points labelled 5, 6', 7', 8' and 9', these latter points forming a line intersecting the first line at point 5 and lying below this line.

From Fig. 1, it will be readily apparent that point 6' is below a point 6 by an amount that depends upon the difference in angle between the rays of light passing through markings 6B and 6C on reticule 4 to the eye 2 of the observer. By properly spacing the markings 6B and 6C on reticule 4, it will also be apparent that the distance between scale points 6 and 6' can be caused to appear to have almost any given physical value. A similar result follows for points 7'—7, 8'—8 and 9'—9.

Now, if point 5 is disposed in a plane passing through the top of the object, whose depth is being measured, and the observer counts down scale points 6', 7', 8' and 9' until he notes where these points intersect a plane passing through the bottom of the object being measured, he will be able to determine the depth of this object, since these scale points can be calibrated in terms of depth. It is, of course, obvious that the depth of a hole or scratch could be measured by placing point 5 at the bottom of the scratch counting up the scale points, merely by reversing reticules 3 and 4, with the result that points 5, 6', 7', 8' and 9' would appear to lie on a line sloping upward from the line joining points 5 to 9.

The principles shown in Fig. 1 are utilized in Fig. 2, wherein there is shown a stereoscopic microscope embodying reticules according to the invention for measuring the depths of objects or cavities of microscopic size. Referring now to this figure, there is shown in cross section a stereoscopic microscope, which could be the Model SKW-5 manufactured by the Bausch and Lomb Optical Co., and having a frame 12. This microscope has a pair of tubes 13, one for each eye, and each containing eyepiece lens systems 14, each tube leading to a separate prism arrangement 15 and thence to separate objective lens systems 16. Prisms 15 serve to erect the image in the microscope so that the image will appear right side up to the observer. Such microscopes are well known to the art and are in widespread daily use in many fields.

Examining now the left tube 13 of Fig. 2, there will be seen a stereoscopic reticule 17 disposed therein, another stereoscopic reticule 18 being disposed in the right tube of this figure. It is these reticules which make it possible to make measurements in accordance with the invention. These reticules are both substantially disposed at planes below their eyepieces where their respective lens systems produce real images, these planes being determined experimentally by adjusting the reticules until they can be clearly seen by an observer.

Referring now to Fig. 3, there is shown a view of stereoscopic reticule 17 taken along line 3—3 of Fig. 2. As can be seen from this figure, a series of linearly arranged, equally spaced, numbered lines or markings 19 are etched thereupon; and below lines 19 and parallel therewith is etched a series of linearly arranged, numbered lines 20 that are spaced and marked exactly like lines 19.

Referring now to Fig. 4, there is shown a view of reticule 18 taken along line 4—4 of Fig. 2, having thereupon a series of lines 21 identical with lines 19 and 20; and below these lines and parallel therewith is a series of numbered lines 22. Lines 22 are displaced by progressively greater amounts from their correspondingly numbered lines 21, as shown.

Referring now to both Figs. 3 and 4, it will be seen that each of the markings or lines shown on the two reticules has a number adjacent thereto. When these reticules are disposed in the microscope of Fig. 3, correspondingly numbered markings of series 19 and 21 appear to coincide and provide a series of markings substantially lying in a plane parallel with the eyes of the user of the microscope and each labelled with a number from 0 to 6. A similar correspondence appears to the eyes of the observer between the series of markings 20 and 22; except that because of the differing distances between the markings 22, the new series of markings appears to lie in substantially a different plane from the first mentioned series of markings and to intersect it at marking 0 thereof. Then by adjusting the microscope so that the 0 marking of the scale formed by lines 19 and 21 is at the top of the object being measured, the scale markings formed by lines 20 and 22 will appear to lie on substantially a straight line intersecting the zero line of the top series of lines and to pass through the object whose depth is being measured. By noting the number of the line passing through the bottom of the object being measured and multiplying it by the depth represented by each number, an accurate measurement of the depth of the object can be obtained.

In an actual embodiment of the invention, the Bausch and Lomb SKW-5 microscope was modified by placing the reticules shown in Figs. 3 and 4 therein where the real images occurred. The spacings between lines of series 19, series 20 and series 21 was chosen as 0.3 millimeter; and the spaces between lines 22 were chosen as follows: between lines 0 and 1 of lines 22, the spacing was 0.3011 mm.; between 1 and 2, it was 0.3022 mm.; between 2 and 3, it was 0.3033 mm.; between 3 and 4, it was 0.3044 mm.; between 4 and 5, it was 0.3055 mm.; and between 5 and 6, it was 0.3066 mm. With this spacing of the lines on the stereoscopic reticules, each line of the series formed by lines 20 and 22 appeared to lie at about 0.25 thousandths of an inch from one another, and it was found possible to measure depths with an accuracy equal to at least 0.1 thousandth of an inch with a microscope objective lens system having a magnification of 1X.

It should be understood that the present invention is not limited to any particular type of stereoscopic microscope, since reticules can readily be designed for all such types of microscopes. Moreover, the particular spacings of the lines on stereoscopic reticules can be chosen so that the lines can be calibrated to lie at heights considerably smaller than 0.25 thousandths of an inch, as will be apparent to one skilled in the art. Moreover, it should be emphasized that this device can be modified to obtain stereoscopic scales appearing to lie toward or away from a user of the microscope, merely by reversing the reticules in the eyepieces or by substituting other reticules therefor.

From the foregoing, it is believed apparent that an instrument has been disclosed which makes it possible for the first time to measure conveniently, in the field, depths having such small magnitudes that their measurements were formerly confined to the laboratory.

While there has been described what is at present considered a preferred embodiment of the invention, it will be obvious to those skilled in the art that various changes and modifications may be made therein without departing from the invention; and it is aimed in the appended claims to cover all such changes and modifications as fall within the true spirit and scope of the invention.

What I claim as new and desire to secure by Letters Patent of the United States is:

1. A depth measuring device comprising, a stereoscopic microscope, and a pair of stereoscopic reticules substantially disposed in the plane in each eyepiece of said microscope where the real image is formed, one of said stereoscopic reticules having a first and a second parallel series of linearly arranged and equally spaced markings thereupon, the other of said stereoscopic reticules having a third and a fourth parallel series of linearly arranged markings thereupon, said third series of markings being identical with said first and second series of markings, one marking of said fourth series of markings being directly under one marking of said third series of markings but the other markings of said fourth series being spaced from those of said third series by given amounts, the markings on said stereoscopic reticules producing a stereoscopic image of two substantially linear reference scales lying in different but intersecting planes and having corresponding points thereon, one reference scale being formed by said first and third series of markings on said reticules and the other reference scale being formed by said second and fourth series of markings, said other reference scale intersecting a plane passing through the top and a plane passing through the bottom of an object whose depth is to be measured, the differing spacings of said fourth series of markings on said other stereoscopic reticule being chosen such that corresponding points on said two reference scales appear displaced from one another by known depths.

2. A depth measuring device comprising, a stereoscopic microscope, and a pair of stereoscopic reticules substantially disposed in the plane in each eyepiece of said microscope where the real image is formed, one of said stereoscopic reticules having a first and a second parallel series of linearly arranged and equally spaced markings thereupon, the other of said stereoscopic reticules having a third and a fourth parallel series of linearly arranged markings thereupon, said third series of markings being identical with said first and second series of markings, one marking of said fourth series of markings being directly under one marking of said third series of markings but the markings of said fourth series being spaced from their corresponding markings of said third series by progressively greater amounts the further away that they are from said one marking of said fourth series, the markings on said stereoscopic reticules producing a stereoscopic image of two sets of substantially linear reference scales lying in different but intersecting planes and having corresponding points thereon, one reference being formed by said first and third series of markings on said reticules and the other reference scale being formed by said second and fourth series of markings, said other reference scale intersecting a plane passing through the top and a plane passing through the bottom of an object whose depth is to be measured, the differing spacings of said fourth series of markings on said other stereoscopic reticule being chosen such that corresponding points on said two reference scales appear displaced from one another by known depths.

References Cited in the file of this patent

UNITED STATES PATENTS

| | | |
|---|---|---|
| 583,703 | De Grousilliers | June 1, 1897 |
| 914,838 | Von Hofe | Mar. 9, 1909 |
| 934,916 | Von Hofe | Sept. 21, 1909 |
| 1,864,899 | French | June 28, 1932 |
| 2,569,498 | Schlatter | Oct. 2, 1951 |